United States Patent Office 3,362,927
Patented Jan. 9, 1968

3,362,927
LIQUID POLYSULFIDE, DIMETHYL SULFOXIDE AND ZINC OXIDE CONTAINING DENTAL IMPRESSION MATERIAL
Edwin H. Lochridge, Glendale, Calif., assignor, by mesne assignments, to Teledyne Dental Corporation, Hawthorne, Calif., a corporation of California
No Drawing. Filed Oct. 23, 1965, Ser. No. 504,074
7 Claims. (Cl. 260—30.8)

ABSTRACT OF THE DISCLOSURE

A rapid setting, e.g. 2 to 10 minutes at normal temperatures, dental impression material composition consisting essentially of the reaction product of a liquid polymerizable polyalkylene polysulfide polymer, 30 to 70% by weight, dimethyl sulfoxide, 0.1 to 10% by weight and powdery zinc oxide 70 to 30% by weight.

---

This invention has to do with improvements in dental impression compositions and methods for their formation and use.

More particularly, the invention is concerned with novel and superior impression materials resulting from the conversion of polysulfide liquid polymer in the presence of dimethyl sulfoxide and a metallic compound. The reaction product is a homogenous substantially water insoluble gel-like or rubber-like material capable of precise conformance to teeth or mouth structures of which the impression is to be made, and possessing that high degree of elasticity and "memory" as will permit the making of accurate casts by so-called dental stone pound and hardened against the impression.

In dentistry, the general practice followed in the use of an impression material is to accommodate the material while in plastic or unset condition within a dental tray and to apply the material to the teeth or mouth structure for a period of time required for the material to acquire an elastic set of hardness, thus to form an impression that will restore to the mouth shape notwithstanding some distortion that may occur in removing the impression, as from undercut mouth configurations. Plastic dental stone subsequently is poured into or against the impression and allowed to harden to form a permanent cast.

A desirable property for such materials is that their coloring be agreeable to their use in the mouth, and that they be conformable to the white, pink or other light shades customarily preferred.

As indicated, the present invention involves the use of liquid polysulfide polymer, and particularly Thiokol Chemical Corporation's polysulfide liquid polymer "LP–2." Hereinafter this material will be referred to as the polysulfide polymer. Chemically it is identified by the manufacturer as a polymer of bis (ethylene oxy) methane containing disulfide linkages, the polymer segments being terminated with reactive thiol (—SH) groups, with side thiol groups occurring "occasionally" in the chain. The average structure of the polysulfide polymer is represented to be as follows, although some of the polymer segments are stated to be branched:

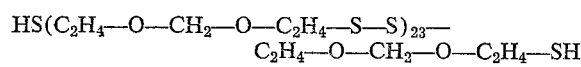

The polysulfide polymer herein contemplated accordingly is a liquid polymer having substantially this average structure at which the manufacturer represents to have an average molecular weight of about 4000. The polymer is not known to be capable of single or fixed formulations, and accordingly is to be regarded as inclusive of those ranges that may have the stated averages.

Heretofore dental impression materials have been made by mixing this polymer with lead dioxide, the resulting products being useable but deficient in certain respects, notably lack of best working qualities and conformability to desirably shorter and controllable setting times, and possession of an unattractive and brownish color that cannot be toned to the preferred and more hygenically acceptable light shades.

I have discovered that the polysulfide polymer may be vulcanized to form an impression material of superior properties in such respects as body, working qualities, water solubility and elastic restorability, and which has neither the setting control or color deficiencies of past impression materials employing this polymer. As hereinafter described, the present material can be made to essentially white color, or to any of various light agreeable shades departing from white according to selected coloring materials.

In accordance with the invention, the polysulfide polymer is used with dimethyl sulfoxide together with zinc oxide, to promote room temperature cure of the polymer mixture. The effect of the dimethyl sulfoxide appears to be that of a promoter rendering pigmented zinc oxide effective as a curing agent within time periods desirable in dental use of the composition. In themselves and individually, the dimethyl sulfoxide and zinc oxide are ineffective for short time cure of the polymer, but together they function effectively and controllably to accomplish the cure in all respects conforming to the convenience of both dentist and patient in producing high quality impressions.

A practicable method is to prepare an inert solution of the polysulfide polymer and dimethyl sulfoxide for use by the dentist, with which is also supplied zinc oxide additive to be mixed with the prepared solution for making of an impression. By controlling the proportions of the components, the setting time of the impression material at room temperature may be predetermined within the range of practicability, and desirably within a period of about 2 to 10 minutes.

For dental impression materials it is desirable to use a known plasticizer for the polysulfide polymer, such plasticizers, of the resin and ester type, as listed in Thiokol Chemical Corporation Bulletin LP–2, include dibutyl phthalate, Arochlors, orthonitrobiphenyl (with dibutyl phthalate), aeromatic distillate, ethyl phthalyl glycollate and methyl phthalyl glycollate. Depending upon the desired plasticizing effect, the amount of plasticizer in relation to the polysulfide polymer may range from 0–40%.

The use of various fillers, coloring agents and flavors may also be incorporated to give the finished compound a pleasing apperance and odor as well as to furnish a consistency within the bounds of that required for proper manipulation.

As compounded, the impression material would be furnished in two parts which, when mixed together, would vulcanize to a rubbery elastomer. Examples of such compositions are as follows:

*Example I*

Part A: Grams
Polysulfide polymer _____ 50
Dimethyl sulfoxide _____ 5
Oil of peppermint _____ .250
Diatomaceous earth _____ 15
Coloring pigment _____ .150
Part B:
Dibutyl phthalate _____ 30
Zinc oxide _____ 60

Each part is mixed separately until a smooth paste is obtained and the parts are packaged separately for ultimate use by the dentist. In use, one part of Part A by weight is mixed with two parts of Part B by weight. These proportions are not critical and may be varied to some degree to achieve the desired consistency and working time. The resulting mixture when put into a dental tray and into a patient's mouth will set to an impression (e.g. of the teeth) retaining a rubbery elastomer within three to ten minutes. Since the reaction is hastened by elevated temperatures and increased humidity, the mixture will congeal more rapidly in the patient's mouth than at ordinary room temperature.

*Example II*

Part A: Grams
- Polysulfide polymer _____ 50
- Dimethyl sulfoxide _____ .500
- Oil of peppermint _____ .250
- Diatomaceous earth _____ 15
- Coloring pigments _____ .150

Part B:
- Dibutyl phthalate _____ 30
- Zinc oxide _____ 60

As before, each part is mixed separately into a smooth paste and packaged separately until ready for use. With one weight part of A intimately and uniformly mixed with two parts of B, the composition will set at room temperature within about five minutes.

There are many grades of zinc oxide available with varying ranges of reactivity, and I do not contemplate confining the invention to any specific grade. I have found it best to select a grade of zinc oxide of medium reactivity and of sufficiently fine particle size, e.g. 0.11–0.27 micron, to render a smooth mixture.

While the well known reaction of a polysulfide rubber and lead dioxide proceeds best in an alkaline environment, the present reactions are enhanced by keeping the ingredients fairly neutral or just slightly acid. This can be accomplished by the choice of filling ingredients and/or plasticizers, or may be adjusted by the addition of a mild acid such as stearic or oleic. If such acidic substances are incorporated they should preferably be added to Part B so as to avoid any possible degradation of the polysulfide rubber when exposed to it over extended periods of time.

As to proportion ranges, workable impression materials capable of controlled setting times at room temperature within a two to ten minute range, and of meeting more precise specifications as for two to three minute setting, may contain with respect to the principal active components, by weight from about 30 to 70% polysulfide polymer, about 0.1 to 10% dimethyl sulfoxide, and about 70 to 30% zinc oxide. The powdered filler, with or without pigment, may range between about 3 to 15%.

I claim:

1. A dental impression material composition consisting essentially of the reaction product of 30 to 70 weight percent liquid polysulfide having substantially the formula

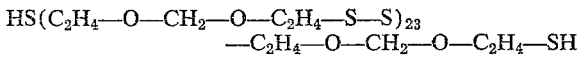

0.10 to 10 weight percent dimethyl sulfoxide and 70 to 30 weight percent zinc oxide powder.

2. The composition of claim 1, containing also diatomaceous earth filler in an amount between 3 and 15 weight percent based on the total composition.

3. The method of producing a dental impression material composition that includes uniformly admixing from 30 to 70 weight percent of a liquid polysulfide polymer having substantially the formula

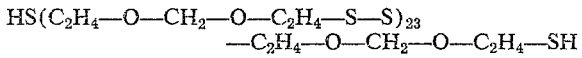

0.10 to 10 weight percent dimethyl sulfoxide and 70 to 30 weight percent zinc oxide, to form the impression material composition and thereafter curing to a set dental impression composition at normal temperatures.

4. The composition of claim 5 in which said composition sets at normal temperatures to retain a dental impression within a period of from two to ten minutes.

5. The composition of claim 2, in which said composition also includes up to 40 weight percent of an organic plasticizer for the polysulfide polymer, based on the total composition.

6. Composition according to claim 1 in which said dimethyl sulfoxide is present in an amount between 0.5 and 5 parts by weight per 50 parts by weight of said liquid polysulfide.

7. Composition according to claim 6 including also 60 parts by weight of zinc oxide per 50 parts by weight of said liquid polysulfide.

References Cited

UNITED STATES PATENTS

| | | | |
|---|---|---|---|
| 3,036,049 | 5/1962 | Leuchten | 260—79.1 |
| 3,046,248 | 7/1962 | Molnar | 260—79.1 |
| 3,317,489 | 5/1967 | Sander | 260—79.1 |

OTHER REFERENCES

Jorcak: Ind.-Eng. Chemistry, vol. 43 (1951), pp. 324–328.

JULIUS FROME, *Primary Examiner.*